United States Patent
Laurberg

(10) Patent No.: US 9,683,550 B2
(45) Date of Patent: Jun. 20, 2017

(54) METHOD FOR OPERATING A WIND TURBINE

(71) Applicant: Hans Laurberg, Århus C (DK)

(72) Inventor: Hans Laurberg, Århus C (DK)

(73) Assignee: SIEMENS AKTIENGESELLSCHAFT, München (DE)

(*) Notice: Subject to any disclaimer, the term of this patent is extended or adjusted under 35 U.S.C. 154(b) by 818 days.

(21) Appl. No.: 13/669,818

(22) Filed: Nov. 6, 2012

(65) Prior Publication Data

US 2013/0136595 A1    May 30, 2013

(30) Foreign Application Priority Data

Nov. 30, 2011 (EP) ..................... 11191273

(51) Int. Cl.
*F03D 7/00* (2006.01)
*F03D 7/02* (2006.01)
*F03D 7/04* (2006.01)

(52) U.S. Cl.
CPC ............ *F03D 7/00* (2013.01); *F03D 7/0276* (2013.01); *F03D 7/0292* (2013.01); *F03D 7/042* (2013.01); *F05B 2270/1095* (2013.01); *F05B 2270/303* (2013.01); *F05B 2270/331* (2013.01); *F05B 2270/332* (2013.01); *Y02E 10/723* (2013.01)

(58) Field of Classification Search
CPC ... F03D 7/00; F03D 7/02; F03D 7/022; F03D 7/0224; F03D 7/0228; F03D 7/0244; F03D 7/0248; F03D 7/0252; F03D 7/0264; F03D 7/0272; F03D 7/0276; F03D 7/0288; F03D 7/0292; F03D 7/042; F03D 7/043; F03D 7/045; F03D 11/0091; F05B 2260/80; F05B 2270/1091; F05B 2270/1095; F05B 2270/303; F05B 2270/3032;

(Continued)

(56) References Cited

U.S. PATENT DOCUMENTS 8,035,246 B2 * 10/2011 Winn .............................. 290/55
2007/0018457 A1   1/2007 Gonzalez
(Continued)

FOREIGN PATENT DOCUMENTS

DE       19902437 A1       7/2000
EP        2325480 A1       5/2011
WO   WO 2011131494 A2 * 10/2011

OTHER PUBLICATIONS

Reilly Dwight H.; "Safety Considerations in the Design and Operation of Large Wind Turbines"; US Department of Energy, Energy Technology; pp. 1-40; 1979.
(Continued)

*Primary Examiner* — Dwayne J White
*Assistant Examiner* — Adam W Brown

(57) ABSTRACT

A method for operating a wind turbine is provided. At least one temperature information indicating the temperature of at least one component of the wind turbine is generated. The temperature information is used for determining at least one material property information indicating at least one component specific, temperature dependent mechanical property of the respective component. At least one operational parameter of the wind turbine is adjusted in consideration of the at least one material property information.

10 Claims, 1 Drawing Sheet

(58) Field of Classification Search
CPC .......... F05B 2270/325; F05B 2270/332; F05B 2270/331; Y02E 10/723
See application file for complete search history.

(56) References Cited

U.S. PATENT DOCUMENTS

| | | | |
|---|---|---|---|
| 2011/0091321 A1* | 4/2011 | Baker et al. ...................... | 416/1 |
| 2011/0123331 A1* | 5/2011 | Stiesdal ............................ | 416/1 |
| 2011/0210549 A1* | 9/2011 | Haag .................... | F03D 7/0204 |
| | | | 290/44 |

OTHER PUBLICATIONS

Beitz W. et al; "Taschenbuch für den Maschinenbau"; Dubbel—Springer; Ed. 20; pp. E25-E27; ISBN: 3-540-67777-1; 2001.
Johnson K. et al; "Controls Advanced Research Turbine: Lessons Learned during Advanced Controls Testing"; National Renewable Energy Laboratory; pp. 1-18; 2005.
Heier Siegfried; "Windkraftanlagen: Systemauslegung, Netzintegration und Regelung"; B. G. Teubner; Ed. 4; pp. 359-372; ISBN: 3-519-36171-X; 2005.
Fischer Rolf; "Elektrische Maschinen"; Carl Hanser Verlag München Wien; Ed. 9; pp. 377-383; ISBN:3-446-18423-6; 1995.

* cited by examiner

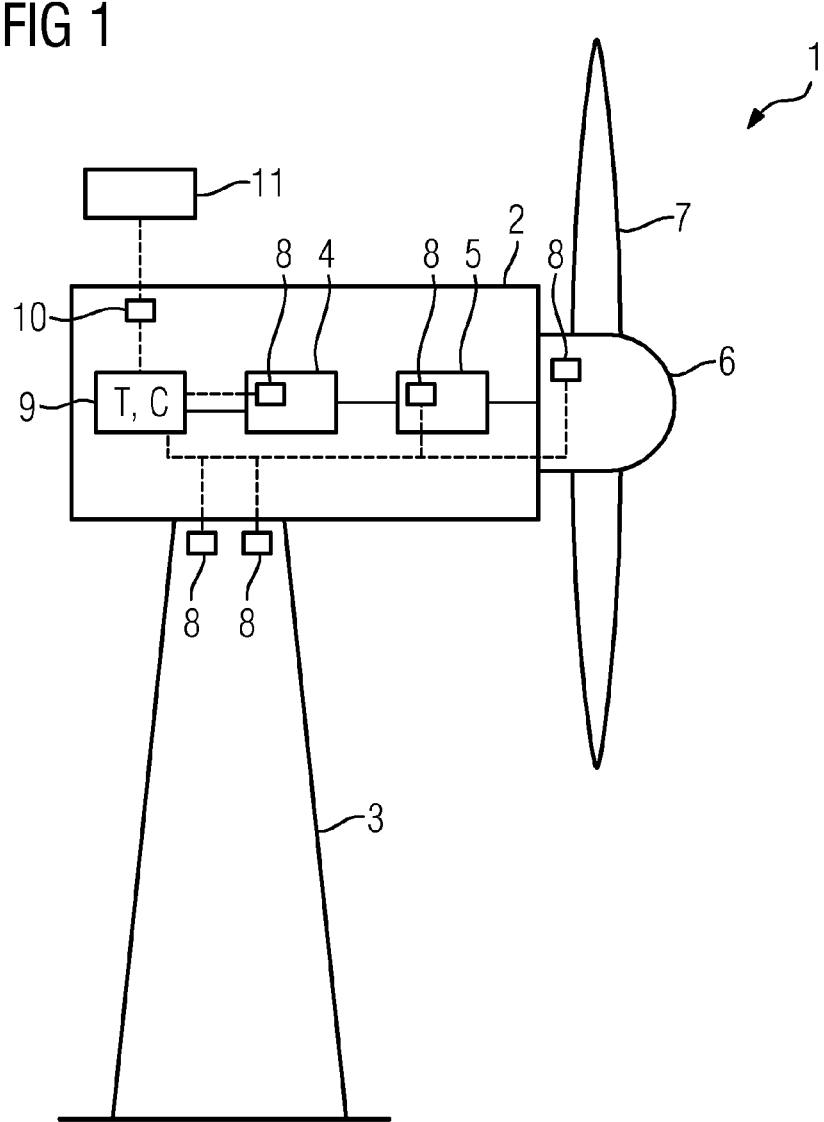
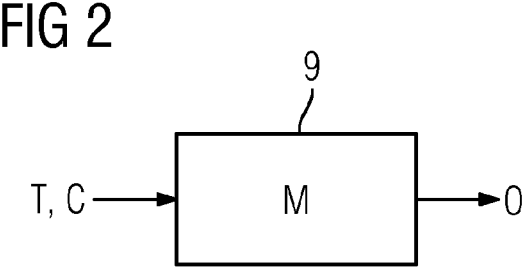

METHOD FOR OPERATING A WIND TURBINE

CROSS REFERENCE TO RELATED APPLICATIONS

This application claims priority of European Patent Office application No. 11191273.9 EP filed Nov. 30, 2011. All of the applications are incorporated by reference herein in their entirety.

FIELD OF INVENTION

The illustrated embodiments relate to a method for operating a wind turbine, whereby at least one temperature information indicating the temperature of at least one component of the wind turbine is generated.

BACKGROUND OF INVENTION

Components of a wind turbine such as a tower construction have to withstand huge mechanical loads during operation. Hence, the used material and construction of respective components of the wind turbine has to be capable of encountering respective mechanical loads.

It is known that respective components of a wind turbine will heat up during operation. Thereby, the temperature of respective components is usually determined by respective temperature sensors allocated to the respective components, whereby the sensor signals of the temperature sensors may be used to generate temperature information indicating the temperature of the respective components. It is to consider that the mechanical properties of respective components may decrease due to the heat up of the components during operation leading to an increase of the component specific load. Hence, the mechanical stability of the respective components may decrease during operation giving rise to possible damage, fatigue, etc.

SUMMARY OF INVENTION

It is an object herein to provide an improved method for operating a wind turbine considering the aforementioned facts.

The object is achieved by a method as initially described, with further feature that the temperature information is used for determining at least one material property information indicating at least one component specific, temperature dependent mechanical property of the respective component, whereby at least one operational parameter of the wind turbine is adjusted in consideration of the at least one material property information.

The principle illustrated herein suggests a method for operating a wind turbine, whereby respective generated temperature information indicating the temperature of at least one component of the wind turbine is used for determining respective component specific material property information indicating at least one component specific, temperature dependent mechanical property of a respective component of the wind turbine. Further, the material property information is considered for adjusting at least one operation parameter of the wind turbine.

According to the illustrated method, the mechanical behaviour of a respective component of the wind turbine is estimated from its temperature indicated by the respective component specific temperature information since most mechanical properties of materials used for manufacturing respective components of a wind turbine are dependent on temperature, i.e. change with changing temperature. Hence, the temperature information may be deemed as a means for deducing the mechanical behaviour of the component for given operational states and/or operational conditions of the respective component and the wind turbine as whole.

Generally, the temperature information may be used for determining diverse temperature dependent mechanical properties of a respective component of the wind turbine. Exemplary temperature dependent mechanical properties are yield strength, tensile strength, ductility, hardness, Young's modulus (E-modulus), shear modulus (G-modulus), bulk modulus, etc. of the respective component. As an example, the yield strength of a respective component such as the tower construction built of the steel type ST 355 typically decreases by ca. 1% when its temperature increases by 11 K.

Thus, by knowing the current temperature of a respective component of the wind turbine, an estimation of its current mechanical properties/behaviour is possible leading to the knowledge or estimation of its current maximum allowable load. In such a manner, the operation of the wind turbine may be dynamically controlled by dynamically adjusting respective operating parameters in accordance with the current mechanical properties of its respective components indicating how much load may be currently applied to the respective components so as to avoid thermally induced risk of damage, fatigue, etc.

The material property information may be determined from the temperature information by means of respective calculation and/or simulation software means using appropriate algorithms adapted to correlate or calculate component specific temperature data to component specific material property data. The software means may be implemented in a control unit such as a wind turbine controller for instance which controls and/or monitors respective operational parameters of the wind turbine.

The term "component" generally refers to all components of the wind turbine such as the tower construction, generators, gear boxes, main bearings, shafts, etc. Of course, respective sub-components of super ordinate components such as the rotatable rotor of a generator or respective gear components of a gear box for instance may also be referred to by the term "component".

In one embodiment, component specific material data concerning the temperature dependency of at least one temperature dependent mechanical property, particularly the yield strength, is considered for determining respective material property information. In such a manner, the component specific temperature information may be correlated with respective component specific material data stored in a storage medium so that a specific material property information may be determined by comparing a current component specific temperature with a respective temperature correlated mechanical behaviour of the respective component for instance. The specific material data may comprise respective characteristic diagrams or look-up tables based on temperature dependency of respective temperature dependent mechanical properties such as the temperature dependency of the yield strength for example. The component specific material data may be supplied from an internal or an external storage medium communicating with the wind turbine or a respective control unit of the wind turbine, respectively by means of a network connection.

In one embodiment, the operational parameter of the wind turbine to be adjusted may be the maximum allowable rotational speed of the wind turbine rotor hub having a number of rotor blades attached thereto. Further operational parameters which may also be denoted as set points may be the power output of the wind turbine, the rotational speed of a possible gear component of a gear box disposed between the rotatable rotor hub and the rotating part of a generator, the rotational speed of other rotatable components and/or the motion speed of movable components, etc. Generally, any operational parameter of the wind turbine influencing the mechanical load of a respective component may be adjusted in this context.

In one embodiment, the maximum allowable rotational speed of the rotor hub is lowered in relation to a rotational speed reference value if the at least one temperature information indicates that the temperature of at least one component exceeds or approaches a component specific threshold temperature. In such a manner, rotational speed of the rotor is individually adjusted in dependency of the current temperature information and consequently, material property information of respective components of the wind turbine. Respective component specific threshold temperatures may be individually determined for each component of the wind turbine, whereby respective temperature dependent material properties of the respective component are considered. Likewise, the maximum allowable rotational speed of the rotor hub may be increased when the temperature information indicates that the temperature of the respective components is (far) below the respective threshold temperature.

Of course, other operational parameters of the wind turbine than the mentioned rotational speed of the rotor may also be individually adjusted in relation to respective reference values if the at least one temperature information indicates that the temperature of the respective components exceeds or approaches a component specific threshold temperature.

In a further embodiment, when generating respective material property information for a number of components of the wind turbine, the maximum allowable rotational speed is adjusted under consideration of the respective material property information of the respective component encountering the highest decrease in mechanical properties. In such a manner, the respective component experiencing the highest decrease in mechanical properties may be decisive for adjusting respective operational parameters of the wind turbine, so that the operation of the wind turbine is adjusted in such a manner that the respective component experiencing the highest decrease in mechanical properties will not encounter any damage.

The temperature information may be determined from the absolute temperature of the respective component and/or from simulations of the absolute temperature of the respective component and/or from temperature relevant parameters of media surrounding the respective component. The absolute temperature of respective component may be derived from respective temperature sensors allocated to respective components of the wind turbine. Simulations of the absolute temperature are usually based on models correlating several component specific and/or ambient parameters with a temperature of the respective component. Temperature relevant parameters of media surrounding the respective component may be temperature, pressure, density, humidity etc. of gases streaming around or along the respective component, for instance.

In like manner it is possible that the temperature information is determined from the absolute temperature of at least one further component and/or from simulations of the absolute temperature of at least one further component and/or media surrounding at least one further component. Thereby, the at least one further component is may be adjacently disposed to the respective component of the wind turbine. It is possible that the component and the at least one further component may be in thermally conductive contact. Again, temperature relevant parameters of media surrounding the respective component may be temperature, pressure, density, humidity etc. of gases streaming around or along the respective component, for instance.

In a further embodiment at least one climatic information concerning current or prospective climatic conditions, particularly air temperature and/or air pressure and/or air density and/or air humidity and/or wind speed, is additionally considered for adjusting the at least one operational parameter of the wind turbine. Hence, additional information is considered for operating the wind turbine. Thereby, the knowledge that respective climatic information concerning the wind turbine are usually related to the operating conditions of the wind turbine and consequently to the operational temperature of respective components of the wind turbine is used. Hence, an improved estimation of current or prospective temperature or temperature changes of respective components is possible. The climatic information may be derived from respective sensors provided with the wind turbine and/or from a network communicating with the wind turbine so as to supply respective climatic information data. The climatic information may also be considered when generating the temperature information.

A further aspect relates to a wind turbine, particularly a direct drive wind turbine, comprising a number of temperature sensors allocated to respective components of the wind turbine and at least one control unit. The control unit is adapted to execute the method according to one of the proceeding claims. The wind turbine is ready to be used in offshore application. The aforementioned explanations concerning the illustrated method also apply to the wind turbine.

BRIEF DESCRIPTION OF THE DRAWINGS

In the following, the illustrated embodiments are described in detail, whereby reference is made to the principle figures. Thereby, FIG. 1 shows a principle drawing of a wind turbine according to an example embodiment; and FIG. 2 shows a principle scheme of a method according to an example embodiment.

DETAILED DESCRIPTION OF INVENTION

FIG. 1 shows a principle drawing of a wind turbine 1 according to an example embodiment. The wind turbine 1 comprises a nacelle 2 disposed on a tower construction 3. The nacelle 2 houses a generator 4 and a gear box 5 disposed upstream to the generator 4 and downstream to a rotor hub 6 having a number of rotor blades 7 attached thereto. The wind turbine 1 is disposed or anchored to ground or sea ground.

As is discernible, temperature sensors 8 are disposed at exemplary locations of the wind turbine 1, i.e. temperature sensors 8 are allocated to the tower construction 3, the generator 4, the gear box 5, and the rotor hub 6. The temperature sensors 8 generate temperature signals which are transmitted to a central control unit 9 in terms of a central wind turbine controller which is adapted to generate a component specific temperature information T indicating the temperature or temperature distributions of each component of the wind turbine 1 provided with a respective temperature sensor 8.

The control unit 9 further communicates with a climatic sensor device 10 providing climatic information C concerning current or prospective climatic conditions, particularly air temperature and/or air pressure and/or air density and/or air humidity and/or wind speed. The climatic sensor device 10 may also communicate with an external network (indicated by box 11) transmitting current or prospective climatic information C to the wind turbine 1.

As a rule, the wind turbine 1 could also be a direct drive wind turbine 1, whereby the generator 4 would be directly connected to the rotor hub 6 without the need of a respective gear box 5.

The illustrated method for operating a wind turbine 1 is described with respect to FIG. 2. Thereby, the control unit 9 generates component specific temperature information T individually indicating the temperature of respective components of the wind turbine 1 such as particularly the tower construction 3, the generator 4, the gear box 5, and the rotor hub 6 on basis of the input of respective temperature signals from the temperature sensors 8. Aside, respective climatic information C originating from the climatic sensor device 10 may be considered as an input to the control unit 9.

The temperature information T may not only be determined from the absolute temperature of the respective components of the wind turbine 1 as submitted by respective sensor signals but also from simulations of the temperature of the respective components and/or from temperature relevant parameters of particularly gaseous media surrounding or streaming along the respective components of the wind turbine 1.

The term "component" refers to all components of the wind turbine 1, particularly to components of the wind turbine 1 being provided with a respective temperature sensor 8. Of course, respective sub-components of super ordinate components such as the rotatable rotor of the generator 4 or respective gear components of the gear box 5 for instance may also be referred to by the term "component".

Besides, absolute temperatures of further components and/or simulations of absolute temperatures of further components and/or temperature relevant parameters of media surrounding further components may be considered for determining the temperature information T. The respective further components of the wind turbine 1 may be thermally conductively connected with a respective component. As an example, a housing of the generator 4 may be a respective further component of the component in the shape of the generator 4. I.e. the temperature of the housing of the generator 4 may also indicate the temperature of the generator 4 itself.

The temperature information T as well as the climatic information C, if need be, are used for determining component specific material property information M individually indicating at least one component specific, temperature dependent mechanical property for the respective components of the wind turbine 1. I.e., for example under additional consideration of component specific material data concerning the temperature dependency of at least one temperature dependent mechanical property of the respective components, the current or prospective material behaviour of the respective components may be determined or estimated.

Therefore, the control unit 9 is provided with an appropriate software means including appropriate algorithms adapted to transfer or calculate the temperature information T in a material property information M.

In the following, the control unit 9 adjusts or controls at least one operational parameter O of the wind turbine 1 in consideration of the at least one material property information M. The operational parameter O may be the maximum allowable rotational speed of the rotor hub 6 and/or the power output of the generator 4 and/or the rotational speed of respective rotatable components of the gear box 5 for instance.

Hence, it is possible to adjust the maximum allowable rotational speed of the rotor hub 6 in relation to a given constant rotational speed reference value if the temperature information T indicates that the temperature of at least one component, such as the gear box 5 for instance, exceeds or approaches a component specific threshold temperature. In such a manner, the maximum allowable rotational speed of the rotor hub 6 may be decreased in relation to the rotational speed reference value if the at least one temperature information T indicates that the temperature of at least one component exceeds or approaches a component specific threshold temperature. The component specific threshold temperature is mainly determined by the material of the respective component.

Likewise, the maximum allowable rotational speed of the rotor hub 6 may be increased in relation to the rotational speed reference value if the at least one temperature information T indicates that the temperature of the component is below the respective component specific threshold temperature.

In such a manner, power output of the wind turbine 1 is dynamically adjusted or optimised without the occurrence of temperature induced damage, fatigue, etc. due to overheating of the respective components of the wind turbine 1 leading to a decrease of the respective mechanical material properties of the components. In other words, the illustrated method allows operating a wind turbine 1 in dependency of a measured and/or estimated temperature of at least one component of the wind turbine 1 in order to compensate the temperature impact on the mechanical properties of the component.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps and the use of articles "a" or "an" does not exclude a plurality.

The invention claimed is:

1. A method for operating a wind turbine, comprising:
    generating at least one temperature information indicating the temperature of at least one component of the wind turbine,
    generating at least one climatic information concerning prospective climatic conditions, wherein the at least one climatic information is temperature;
    determining, using said temperature information and said climatic information, at least one material property information indicating at least one component specific, temperature dependent mechanical property of the at least one component of the wind turbine, wherein the temperature dependent mechanical property is temperature dependent yield strength, and adjusting at least one operational parameter of the wind turbine in consideration of the at least one material property information.

2. The method according to claim 1, wherein data specific to at least one component of the wind turbine concerning temperature dependency of at least one temperature dependent mechanical property is considered for determining material property information.

3. The method according to claim 1, wherein the at least one temperature information is determined from an absolute temperature of the at least one component of the wind turbine and from simulations of the temperature of the at least one component of the wind turbine and from temperature relevant parameters of media surrounding the at least one component of the wind turbine.

4. The method according to claim 1, wherein the at least one temperature information is determined from an absolute temperature of at least one further component of the wind turbine and from simulations of the temperature of the at least one further component of the wind turbine and from media surrounding the at least one further component of the wind turbine.

5. The method according to claim 4, wherein, when generating at least one material property information for a number of components, a maximum allowable rotational speed is adjusted under consideration of the at least one material property information of a component encountering the highest decrease in mechanical properties.

6. The method according to claim 1, wherein adjusting the at least one operational parameter of the wind turbine includes adjusting a maximum allowable rotational speed of a wind turbine rotor hub having a plurality of rotor blades attached thereto.

7. The method according to claim 6, wherein the maximum allowable rotational speed of the wind turbine rotor hub is lowered in relation to a rotational speed reference value if the at least one temperature information indicates that the temperature of the at least one component of the wind turbine exceeds or approaches a component specific threshold temperature.

8. The method according to claim 1, further comprising a second climatic information concerning current or prospective climatic conditions, wherein the second climatic information includes air density and/or wind speed.

9. A wind turbine, comprising:
a plurality of components,
a plurality of temperature sensors allocated to respective components of the wind turbine, and
at least one control unit that:
generates at least one temperature information indicating a temperature of at least one component of the wind turbine,
generates at least one climatic information concerning prospective climatic conditions, wherein the at least one climatic information is temperature;
determines, using said temperature information and said at climatic information, at least one material property information indicating at least one component specific, temperature dependent mechanical property of the at least one component of the wind turbine, wherein the temperature dependent mechanical property is temperature dependent yield strength, and
adjusts at least one operational parameter of the wind turbine in consideration of the at least one material property information.

10. The wind turbine according to claim 9, wherein the wind turbine is a direct drive wind turbine.

* * * * *